United States Patent
Wakizaka

(10) Patent No.: US 8,040,816 B2
(45) Date of Patent: Oct. 18, 2011

(54) WIRELESS COMMUNICATION APPARATUS THAT SUCCESSIVELY CHANGE COMMUNICATION FREQUENCY BAND

(75) Inventor: Masaaki Wakizaka, Ichinomiya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 846 days.

(21) Appl. No.: 12/055,287

(22) Filed: Mar. 25, 2008

(65) Prior Publication Data

US 2008/0240066 A1 Oct. 2, 2008

(30) Foreign Application Priority Data

Mar. 30, 2007 (JP) ................. 2007-091610

(51) Int. Cl.
*H04B 7/216* (2006.01)
(52) U.S. Cl. ......... 370/252; 370/335; 370/342; 370/343
(58) Field of Classification Search ................. None
See application file for complete search history.

(56) References Cited

U.S. PATENT DOCUMENTS

| | | | | |
|---|---|---|---|---|
| 6,009,332 | A * | 12/1999 | Haartsen ................. | 455/450 |
| 7,006,451 | B2 * | 2/2006 | Kuwahara ................. | 370/252 |
| 7,016,395 | B2 * | 3/2006 | Watanabe et al. ......... | 375/132 |
| 7,116,700 | B1 * | 10/2006 | Sivakumar ................. | 375/132 |
| 2003/0219002 | A1 | 11/2003 | Kishida | |
| 2004/0013168 | A1 * | 1/2004 | Haines et al. ............... | 375/132 |
| 2006/0194597 | A1 | 8/2006 | Ishidoshiro | |
| 2006/0221926 | A1 | 10/2006 | Maekawa et al. | |
| 2007/0049319 | A1 * | 3/2007 | Hart et al. ................. | 455/522 |

FOREIGN PATENT DOCUMENTS

| | | |
|---|---|---|
| EP | 1111947 A1 | 6/2001 |
| EP | 1220499 A2 | 7/2002 |
| JP | 2002-095062 A | 3/2002 |
| JP | 2002198867 A | 7/2002 |
| JP | 2002198868 A | 7/2002 |
| JP | 2003-023674 A | 1/2003 |

(Continued)

OTHER PUBLICATIONS

European Patent Office; Search Report in European Patent Application No. 08251084.3 (counterpart to the above-captioned U.S. patent application) mailed Feb. 10, 2010.

(Continued)

*Primary Examiner* — Robert Scheibel
(74) *Attorney, Agent, or Firm* — Baker Botts L.L.P.

(57) ABSTRACT

A wireless communication apparatus including: a specific external communication section configured to communicate with a specific external communication device through a wireless communication while successively changing a communication frequency band that is a frequency band in which a communication is performed; and a communication condition recognizing section configured to recognize a communication condition in each of a plurality of frequency ranges each having a predetermined range width, wherein the specific external communication section determines, on the basis of the recognized communication condition in each of the plurality of frequency ranges, a set number of a plurality of communication planned frequency bands in each of which the specific external communication section is planned to communicate with the specific external communication device, by allocating to a part of the plurality of frequency ranges, and wherein the specific external communication section communicates, in the determined communication planned frequency bands, with the specific external communication device while successively changing the communication frequency band.

24 Claims, 8 Drawing Sheets

FOREIGN PATENT DOCUMENTS

| | | |
|---|---|---|
| JP | 2003-234745 A | 8/2003 |
| JP | 2003-249973 A | 9/2003 |
| JP | 2004-159053 A | 6/2004 |
| JP | 2004-363728 A | 12/2004 |
| JP | 2006-295871 A | 10/2006 |
| WO | 2004-082213 A1 | 9/2004 |

OTHER PUBLICATIONS

Japan Patent Office; Notification of Reason for Refusal in Japanese Patent Application No. 2007-091610 (counterpart to the above-captioned US patent application) mailed Jul. 30, 2009.

* cited by examiner

FIG.5

1ch SSID:A RSSI:-10db
SSID:B RSSI:-15db

2ch NO SSID

3ch SSID:C RSSI:-70db
SSID:D RSSI:-60db

4ch SSID:E RSSI:-30db

5ch NO SSID

6ch SSID:F RSSI:-40db
SSID:G RSSI:-50db
SSID:H RSSI:-45db
SSID:I RSSI:-35db
SSID:J RSSI:-25db

7ch NO SSID

8ch SSID:K RSSI:-60db
SSID:L RSSI:-60db
SSID:M RSSI:-60db
SSID:N RSSI:-60db
SSID:O RSSI:-60db

9ch SSID:Q RSSI:-70db

10ch NO SSID

11ch SSID:R RSSI:-40db
SSID:S RSSI:-50db
SSID:T RSSI:-45db
SSID:U RSSI:-35db
SSID:V RSSI:-25db

12ch NO SSID

13ch SSID:W RSSI:-60db
SSID:X RSSI:-60db
SSID:Y RSSI:-20db

14ch SSID:Z RSSI:-70db

WIRELESS COMMUNICATION APPARATUS THAT SUCCESSIVELY CHANGE COMMUNICATION FREQUENCY BAND

CROSS REFERENCE TO RELATED APPLICATION

The present application claims priority from Japanese Patent Application No. 2007-091610, which was filed on Mar. 30, 2007, the disclosure of which is herein incorporated by reference in its entirety.

BACKGROUND OF THE INVENTION

1. Field of the Invention

The present invention relates to a wireless communication apparatus configured to communicate with a specific external communication device while successively changing a communication frequency band or a channel.

2. Description of the Related Art

As a technology for connecting a wireless LAN device, there is conventionally known an IEEE 802.11 standard, a Bluetooth (registered trademark) standard, and so on.

The wireless LAN device and a digital cordless phone use the same 2.4 GHz frequency band. Thus, where the wireless LAN device and the digital cordless phone are used in the same area at the same time, a radio interference unfortunately occurs therebetween, resulting in an unsatisfactory communication.

Patent Document 1 (Japanese Patent Application Publication No. 2002-198867) and Patent Document 2 (Japanese Patent Application Publication No. 2002-198868) disclose techniques for reducing the possibility of the occurrence of the radio interference where the wireless LAN device and the digital cordless phone are used in the same area at the same time. In the techniques, a bit error rate (BER), an electric field intensity, and the like in each of frequency ranges (i.e., channels) are measured and recognized before communication, so as to reduce the possibility of the occurrence of the radio interference by not using frequency ranges in each of which the radio interference is likely to occur.

SUMMARY OF THE INVENTION

However, where communication frequency bands are determined so as to reduce the possibility of the occurrence of the radio interference at a time of the determination, a wireless communication using the determined communication frequency bands is susceptible to interference waves which occur at irregular intervals. Thus, a time for recognizing a communication condition needs to be made longer in order to increase an accuracy for determining communication frequency bands in which the wireless communication is less affected by the interference waves.

This invention has been developed in view of the above-described situation, and it is an object of the present invention to provide a wireless communication apparatus which is less affected by the interference waves.

The object indicated above may be achieved according to the present invention which provides a wireless communication apparatus including: a specific external communication section configured to communicate with a specific external communication device through a wireless communication while successively changing a communication frequency band that is a frequency band in which a communication is performed; and a communication condition recognizing section configured to recognize a communication condition in each of a plurality of frequency ranges each having a predetermined range width, wherein the specific external communication section determines, on the basis of the recognized communication condition in each of the plurality of frequency ranges, a set number of a plurality of communication planned frequency bands in each of which the specific external communication section is planned to communicate with the specific external communication device, by allocating to a part of the plurality of frequency ranges, and wherein the specific external communication section communicates, in the determined communication planned frequency bands, with the specific external communication device while successively changing the communication frequency band.

In the image recording apparatus constructed as described above, the occurrence of the radio interference with the communication between the specific external communication section and the specific external communication device can be effectively prevented.

BRIEF DESCRIPTION OF THE DRAWINGS

The above and other objects, features, advantages, and technical and industrial significance of the present invention will be better understood by reading the following detailed description of preferred embodiment of the invention, when considered in connection with the accompanying drawings, in which:

FIG. 5 is an example of a compilation of network identifying information received by the wireless LAN transmitting and receiving portion 7 of the wireless communication apparatus 1;

DESCRIPTION OF THE PREFERRED EMBODIMENT

Figure 1:
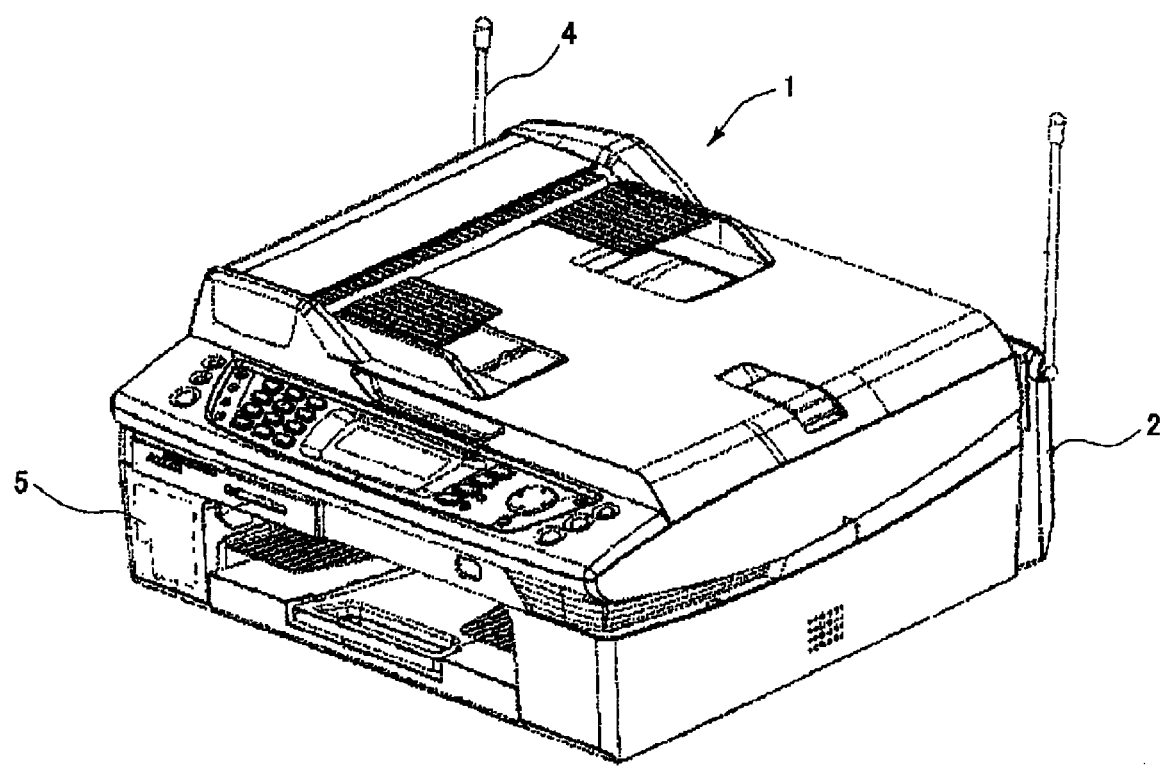
FIG. 1 is a perspective view of a wireless communication apparatus 1 as an embodiment of the present invention.

Hereinafter, there will be described a preferred embodiment of the present invention by reference to the drawings. It is to be understood that the following embodiment is described only by way of example, and the invention may be otherwise embodied with various modifications without departing from the scope and spirit of the invention. FIG. 1 is a perspective view of a wireless communication apparatus 1 as the embodiment of the present invention. The wireless communication apparatus 1 can establish two communication systems with various devices, i.e., a cordless phone system and a wireless LAN system. The wireless communication apparatus 1 is equipped with a handset 2 as a specific external communication device that is a digital cordless phone capable of communicating with the wireless communication apparatus 1 as a main unit configured to perform a cordless phone communication, a digital cordless antenna portion 4 for transmitting and receiving data when the wireless communication apparatus 1 is communicating with the handset 2 through a wireless communication (i.e., the cordless phone communication), and a wireless LAN antenna portion 5 for transmitting and receiving data when the wireless communication apparatus 1 is communicating with external wireless LAN devices as external communication devices.

Figure 2:
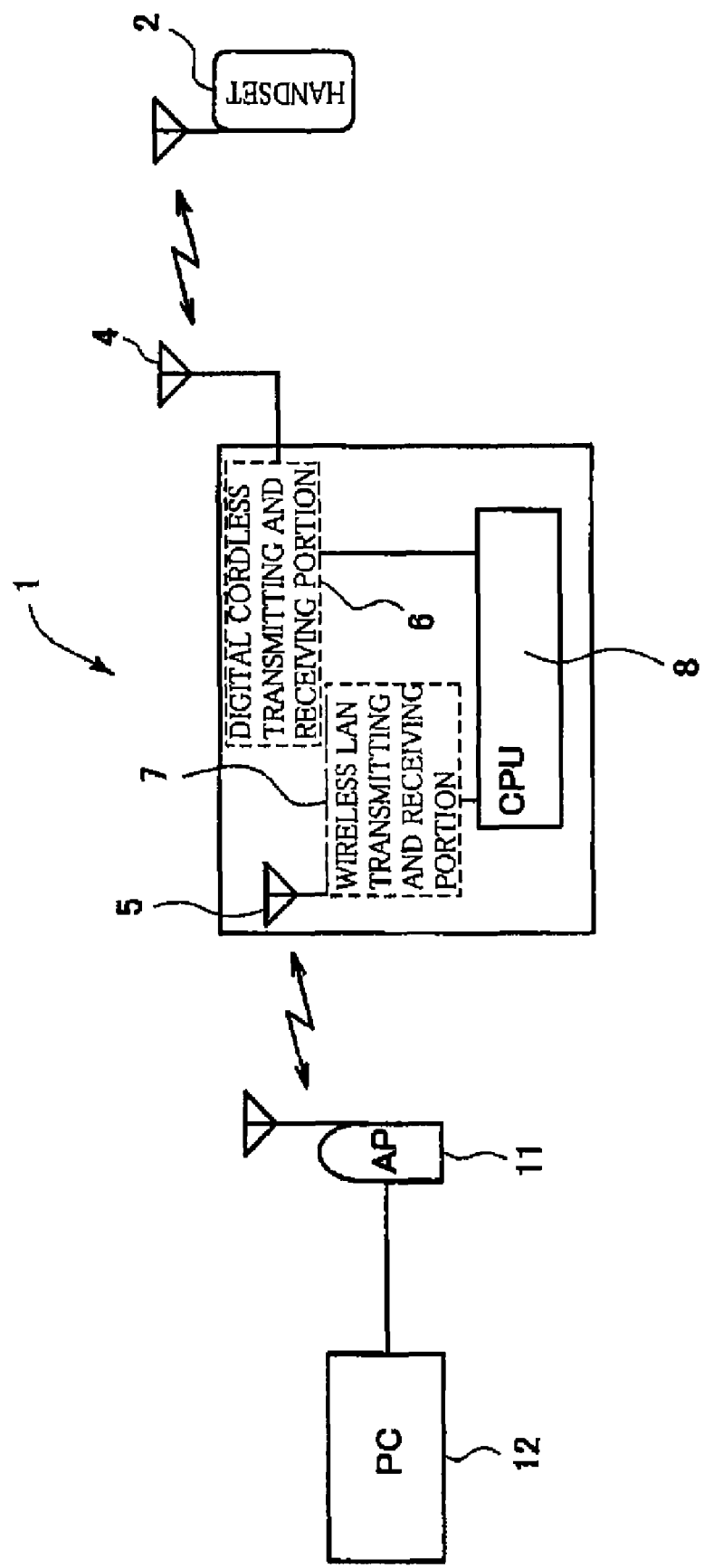
FIG. 2 is a schematic view showing a configuration of the wireless communication apparatus 1.

FIG. 2 is a schematic view showing a configuration of the wireless communication apparatus 1. The wireless communication apparatus 1 is constituted by, in addition to the digital cordless antenna portion 4 and the wireless LAN antenna portion 5, a digital cordless (DCL) transmitting and receiving portion 6 for communicating, as a specific external communication section, with the handset 2, a wireless LAN (WLAN) transmitting and receiving portion 7 as another external communication section communicable with the external wireless LAN devices through the wireless communication using the wireless LAN system, a CPU 8 for controlling components of the wireless communication apparatus 1, and the like. When received from a command from the CPU 8, the digital cordless transmitting and receiving portion 6 communicates with the handset 2 through the wireless communication. Also, FIG. 2 shows one of access points (APs) 11 and one of PCs 12 connected thereto, each as one of the external wireless LAN devices. When received from a command from the CPU 8, the wireless LAN transmitting and receiving portion 7 communicates through the wireless communication with the PCs 12 via the access points 11 respectively connected thereto.

Figure 3:
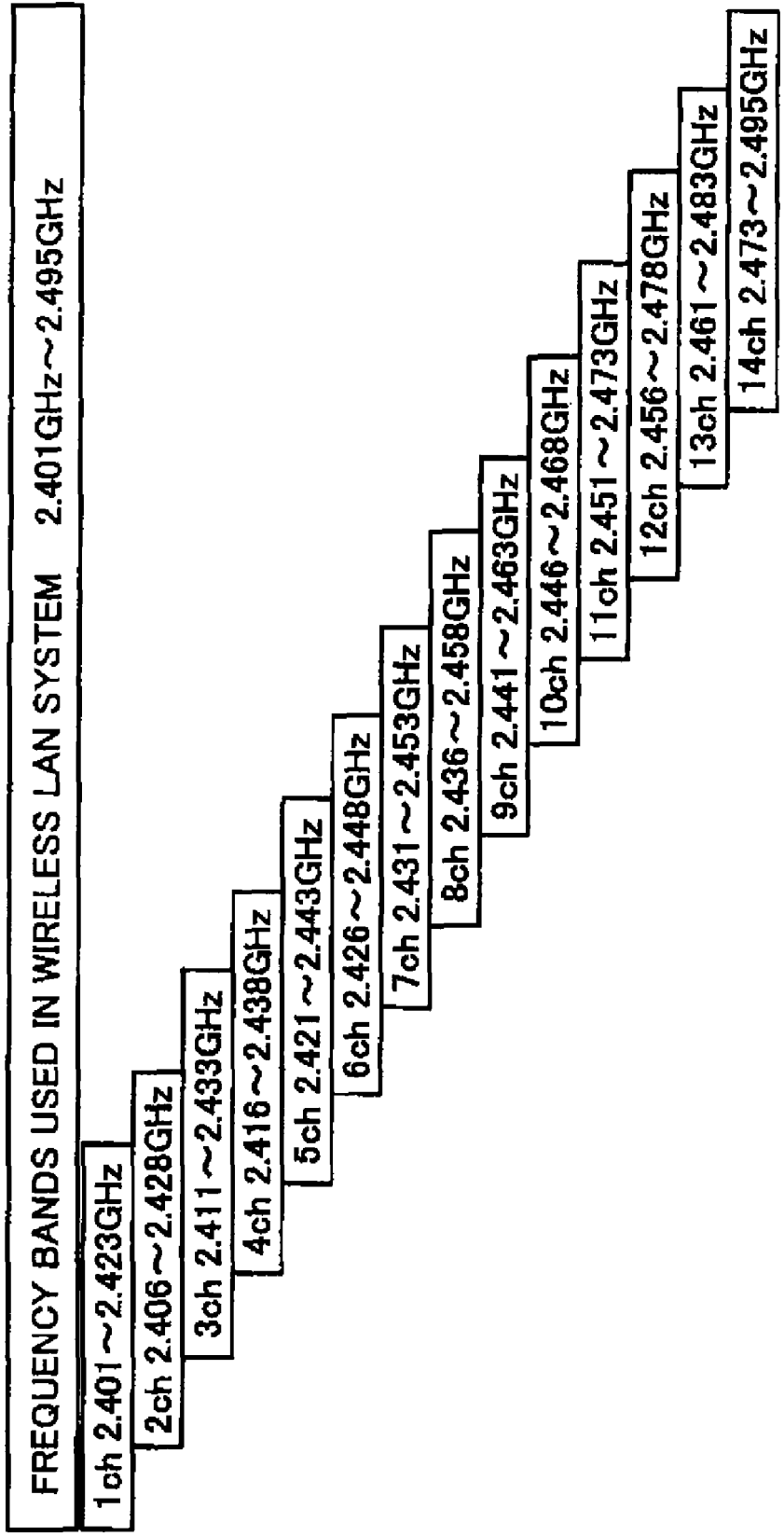
FIG. 3 is a view showing respective relationships between frequency bands and channels used by a wireless LAN transmitting and receiving portion 7 of the wireless communication apparatus 1.

FIG. 3 is a view showing respective relationships between frequency bands and channels used by the wireless LAN transmitting and receiving portion 7. The wireless LAN system uses the 2.4 GHz frequency band which is one of specific frequency bands named as Industry Science Medical (ISM) bands. As shown in FIG. 3, the 2.4 GHz frequency band is divided into fourteen channels (i.e., frequency ranges) as communicable frequency bands each having a predetermined pitch of about 5 MHz. Each of the external wireless LAN devices can selectively use any one or more of the channels. Also, each of the fourteen channels can be divided into a plurality of communication frequency bands. It is stipulated that a set number of communication frequency bands must be always secured in communication using the cordless phone system. Thus, the cordless phone communication between the wireless communication apparatus 1 and the handset 2 is performed using the set number of the communication frequency bands. More specifically, the wireless communication apparatus 1 communicates with the handset 2 through the cordless phone communication using one of the communication bands at one time while successively changing the communication frequency bands. It is noted that the set number of the communication frequency bands in each of which the digital cordless transmitting and receiving portion 6 is planned to communicate with the handset 2 may be referred to as communication planned frequency bands.

Hereinafter, there will be explained, with reference to flow charts, operations or processings of the digital cordless transmitting and receiving portion 6 and the wireless LAN transmitting and receiving portion 7 when the set number of the communication planned frequency bands are determined.

Figure 4:
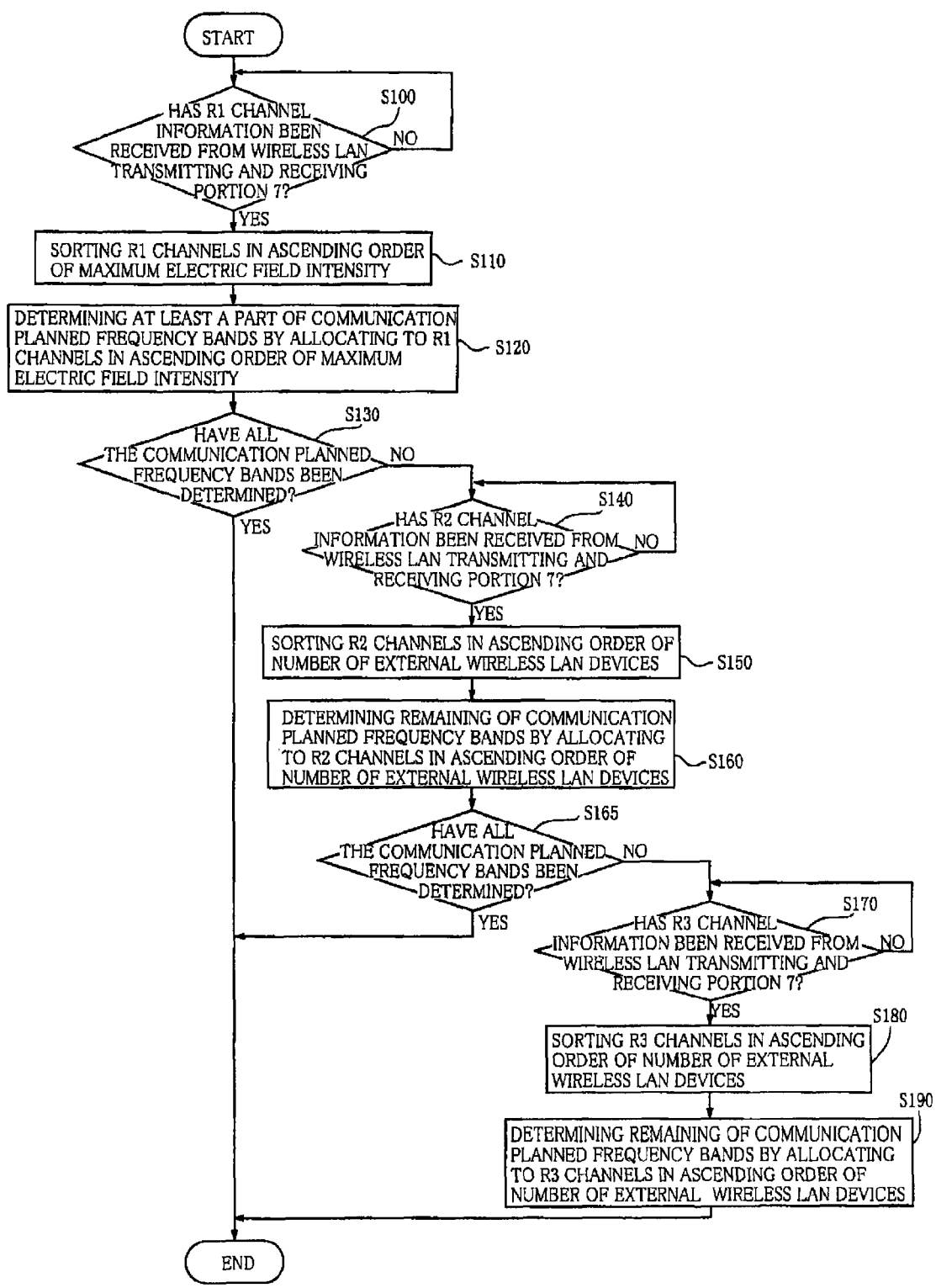
FIG. 4 is a flow chart showing a processing performed by a digital cordless transmitting and receiving portion 6.

FIG. 4 is a flow chart showing a processing of the digital cordless transmitting and receiving portion 6. Each of the access points 11 transmits network identifying information thereabout. More specifically, the network identifying information includes a Service Set Identifier (SSID) that is a name for identifying the external wireless device, and the following information relating to the SSID: a frequency band being used by the external wireless device, and an electric field intensity in the frequency band, an electric field intensity to be generated by the external wireless device in the frequency band, and so on, for example. The wireless LAN transmitting and receiving portion 7 also functions as a communication condition recognizing section and recognizes, on the basis of the received network identifying information, a communication condition in each of the channels. More specifically, the wireless LAN transmitting and receiving portion 7 recognizes a number of the external wireless LAN devices and the electric field intensity in each of the channels. It is noted that the electric field intensity is generated by one of the external wireless LAN devices communicating in each channel, which one is to generate the maximum electric field intensity. The wireless LAN transmitting and receiving portion 7 transmits, to the digital cordless transmitting and receiving portion 6, channel informations each of which is information about the communication condition in each channel. Each of the channel informations includes the number of the recognized external wireless LAN devices and the recognized electric field intensity in each of the channels. It is noted that, in the present embodiment, each channel information can be separated into R1 channel information, R2 channel information, and R3 channel information which will be explained below. The digital cordless transmitting and receiving portion 6 determines, on the basis of the channel information in each channel, the above-described communication planned frequency bands. More specifically, the wireless LAN transmitting and receiving portion 7 determines, on the basis of the number of the external wireless LAN devices and the electric field intensity in each channel, the communication planned frequency bands by allocating to a part of the communication frequency bands, such that an interference with the cordless phone communication between the wireless communication apparatus 1 and the handset 2 is minimized.

The radio interference is more likely to occur where there is one device generating a relatively high electric field intensity than where there are plurality of devices each generating a relatively low electric field intensity. Thus, in this wireless communication apparatus 1, a specific threshold intensity n1 and a specific threshold number n2 are set respectively as a specific electric field intensity and a specific number of the external wireless LAN devices, and the set number of the communication planned frequency bands are determined on the assumption that the radio interference is less likely to occur in one channel in the following order: a case in which a maximum electric field intensity in the channel is lower than the specific threshold intensity n1 and the number of the external wireless LAN devices in the channel is smaller than the specific threshold number n2 (in this case, the channel may be referred to as a low-electric-field-intensity-small-device-number range), a case in which the maximum electric field intensity in the channel is lower than the specific threshold intensity n1 and the number of the external wireless LAN devices in the channel is equal to or larger than the specific threshold number n2 (in this case, the channel may be referred to as a low-electric-field-intensity-large-device-number range), and a case in which the maximum electric field intensity in the channel is equal to or higher than the specific threshold intensity n1 (in this case, the channel may be referred to as a high-electric-field-intensity range).

Initially, the digital cordless transmitting and receiving portion 6 judges, in S100, whether the above-described R1 channel information is transmitted from the wireless LAN transmitting and receiving portion 7. Where a channel in which the communication condition is recognized is R1 channel, the R1 channel information is the above-described channel information about the channel. The R1 channel is a channel in which the electric field intensity in one channel is lower than the specific threshold intensity n1 and the number of the external wireless LAN devices in the channel is smaller than the specific threshold number n2. That is, where the channel is the above-described low-electric-field-intensity-small-device-number range, the channel is recognized to be the R1 channel by the wireless LAN transmitting and receiving portion 7.

FIG. 5 is an example of a compilation of network identifying information received by the wireless LAN transmitting and receiving portion 7. A Received Signal Strength Indication (RSSI) is a value that indicates a strength of a signal to be received by the wireless LAN devices such as this wireless communication apparatus 1. In FIG. 5, a value of each of the RSSIs indicates an electric field intensity in a frequency band used by a corresponding one of the external wireless LAN devices that respectively correspond to the SSIDs. The electric field intensity is shown for each of the fourteen channels used in the wireless LAN system, and each channel has the corresponding predetermined frequency range. Thus, the electric field intensity in each channel can be recognized. In this wireless communication apparatus 1, recognition that the radio interference is more likely to occur is firstly performed on the basis that the electric field intensity is relatively high in the channel, and secondly performed on the basis that the number of the external wireless LAN devices is relatively large. For example, in the network identifying information shown in FIG. 5, the possibility of the occurrence of the radio interference is the highest in a channel 1 (1*ch*) among all the channels, the second highest in a channel 13 (13*ch*), and the third highest in a channel 6 (6*ch*) or a channel 11 (11*ch*).

Where the digital cordless transmitting and receiving portion 6 has received the R1 channel information from the wireless LAN transmitting and receiving portion 7 (S100: Yes), the digital cordless transmitting and receiving portion 6 sorts, in S110, the R1 channels in ascending order of the maximum electric field intensity. Then, in S120, the digital cordless transmitting and receiving portion 6 allocates at least a part of the communication planned frequency bands to the R1 channels in ascending order of the maximum electric field intensity up to the set number. That is, in S110 and S120, the digital cordless transmitting and receiving portion 6 determines, on the priority basis, the communication planned frequency bands by allocating to the R1 channels each satisfying the condition that the maximum electric field intensity in the channel is lower than the specific threshold intensity n1 and that the number of the external wireless LAN devices in the channel is smaller than the specific threshold number n2. In other words, the digital cordless transmitting and receiving portion 6 determines the communication planned frequency bands by allocating to the R1 channels in ascending order of the maximum electric field intensity in an allocation to the low-electric-field-intensity-small-device-number ranges. It is noted that where the digital cordless transmitting and receiving portion 6 has not received the R1 channel information from the wireless LAN transmitting and receiving portion 7 (S100: No), the digital cordless transmitting and receiving portion 6 waits until the reception of the R1 channel information.

Subsequently, in S130, the digital cordless transmitting and receiving portion 6 judges whether all the communication planned frequency bands have been determined. Where all the communication planned frequency bands have been determined (S130: YES), the digital cordless transmitting and receiving portion 6 judges to have secured the set number of the communication planned frequency bands. Then, this processing is completed.

Where all the communication planned frequency bands have not been determined (S130: NO), the digital cordless transmitting and receiving portion 6 determines, in the following procedures, remaining at least one of the communication planned frequency bands by allocating to R2 channels which will be explained below.

More specifically, in S140, the digital cordless transmitting and receiving portion 6 judges whether the digital cordless transmitting and receiving portion 6 has received, from the wireless LAN transmitting and receiving portion 7, the above-described R2 channel information. Where a channel in which the communication condition is recognized is R2 channel, the R2 channel information is the above-described channel information about the channel. The R2 channel is a channel in which the electric field intensity in one channel is lower than the specific threshold intensity n1 and the number of the external wireless LAN devices in the channel is larger than the specific threshold number n2. That is, where the channel is the above-described low-electric-field-intensity-large-device-number range, the channel is recognized to be the R2 channel by the wireless LAN transmitting and receiving portion 7.

Where the digital cordless transmitting and receiving portion 6 has received the R2 channel information from the wireless LAN transmitting and receiving portion 7 (S140: YES), the digital cordless transmitting and receiving portion 6 sorts, in S150, the R2 channels in ascending order of the number of the external wireless LAN devices. Where the digital cordless transmitting and receiving portion 6 has not received the R2 channel information from the wireless LAN transmitting and receiving portion 7 (S140: NO), the digital cordless transmitting and receiving portion 6 waits until the reception of the R2 channel information.

The digital cordless transmitting and receiving portion 6 which has sorted the R2 channels in S150 determines, in S160, remaining at least one of the communication planned frequency bands by allocating to the R2 channels in ascending order of the number of the external wireless LAN devices up to the set number. That is, in S150 and S160, the digital cordless transmitting and receiving portion 6 determines, on the priority basis, the remaining at least one of the communication planned frequency band by allocating to the R2 channels each satisfying the condition that the maximum electric field intensity in the channel is lower than the specific threshold intensity n1 and that the number of the external wireless LAN devices in the channel is equal to or larger than the specific threshold number n2. In other words, the digital cordless transmitting and receiving portion 6 determines the remaining at least one of the communication planned frequency bands by allocating to the R2 channels in ascending order of the number of the external wireless LAN devices in an allocation to the low-electric-field-intensity-large-device-number ranges.

Subsequently, in S165, the digital cordless transmitting and receiving portion 6 judges whether all the communication planned frequency bands have been determined. Where all the communication planned frequency bands have been determined (S165: YES), the digital cordless transmitting and receiving portion 6 judges to have secured the set number of the communication planned frequency bands. Then, this processing is completed. That is, in S100 to S165, the digital cordless transmitting and receiving portion 6 determines the communication planned frequency bands by allocating, on the priority basis, to low-electric-field-intensity ranges of the frequency ranges in each of which the electric field intensity is lower than the specific threshold intensity n1.

Where all the communication planned frequency bands have not been determined (S165: NO), the digital cordless transmitting and receiving portion 6 determines remaining at least one of the communication planned frequency bands by allocating to remaining channels in ascending order of the number of the external wireless LAN devices in the following procedures.

Initially, in S170, the digital cordless transmitting and receiving portion 6 judges whether the digital cordless transmitting and receiving portion 6 has received, from the wireless LAN transmitting and receiving portion 7, the above-described R3 channel information. Where a channel in which the communication condition is recognized is R3 channel, the R3 channel information is the above-described channel information about the channel. The R3 channel is a channel in which the electric field intensity in one channel is equal to or higher than the specific threshold intensity n1. That is, where the channel is the above-described high-electric-field-intensity range, the channel is recognized to be the R2 channel by the wireless LAN transmitting and receiving portion 7.

Where the digital cordless transmitting and receiving portion 6 has received the R3 channel information from the wireless LAN transmitting and receiving portion 7 (S170: YES), the digital cordless transmitting and receiving portion 6 sorts, in S180, the R3 channels in ascending order of the number of the external wireless LAN devices. Where the digital cordless transmitting and receiving portion 6 has not received the R3 channel information from the wireless LAN transmitting and receiving portion 7 (S170: NO), the digital cordless transmitting and receiving portion 6 waits until a reception of the R3 channel information.

The digital cordless transmitting and receiving portion 6 which has sorted the R3 channels in S180 determines, in S190, remaining at least one of the communication planned frequency bands by allocating to the R3 channels in ascending order of the number of the external wireless LAN devices. That is, in S180 and S190, the digital cordless transmitting and receiving portion 6 determines remaining at least one of the communication planned frequency bands by allocating to the R3 channels each satisfying the condition that the maximum electric field intensity in the channel is equal to or higher than the specific threshold intensity n1. In other words, the digital cordless transmitting and receiving portion 6 determines the remaining at least one of the communication planned frequency bands by allocating to the R3 channels in ascending order of the number of the external wireless LAN devices in an allocation to high-electric-field-intensity ranges. Thus, the digital cordless transmitting and receiving portion 6 can determine the remaining at least one of the communication planned frequency bands by allocating to the R3 channels in ascending order of the possibility of the occurrence of the radio interference. In the above-described procedures, since all the channels are sorted in ascending order of the possibility of the occurrence of the radio interference, the digital cordless transmitting and receiving portion 6 judges to have secured the set number of the communication planned frequency bands. Then, this processing is completed. Generally, in the above-explained procedures, the digital cordless transmitting and receiving portion 6 determines the communication planned frequency bands by allocating to ones of the frequency ranges in ascending order of the electric field intensity. Further, generally, in the above-explained procedures, the digital cordless transmitting and receiving portion 6 determines the communication planned frequency bands by allocating to ones of the frequency ranges in ascending order of the number of the communicating communication devices.

Thereafter, the digital cordless transmitting and receiving portion 6 communicates with the handset 2 through the wireless communication while successively changing among the communication planned frequency bands determined in the above-described processing. That is, the digital cordless transmitting and receiving portion 6 communicates with the handset 2 through the wireless communication using a frequency hopping in the communication planned frequency bands determined in the above-described processing. As a result, a good quality of the cordless phone communication between the wireless communication apparatus 1 and the handset 2 is ensured.

Figure 6:
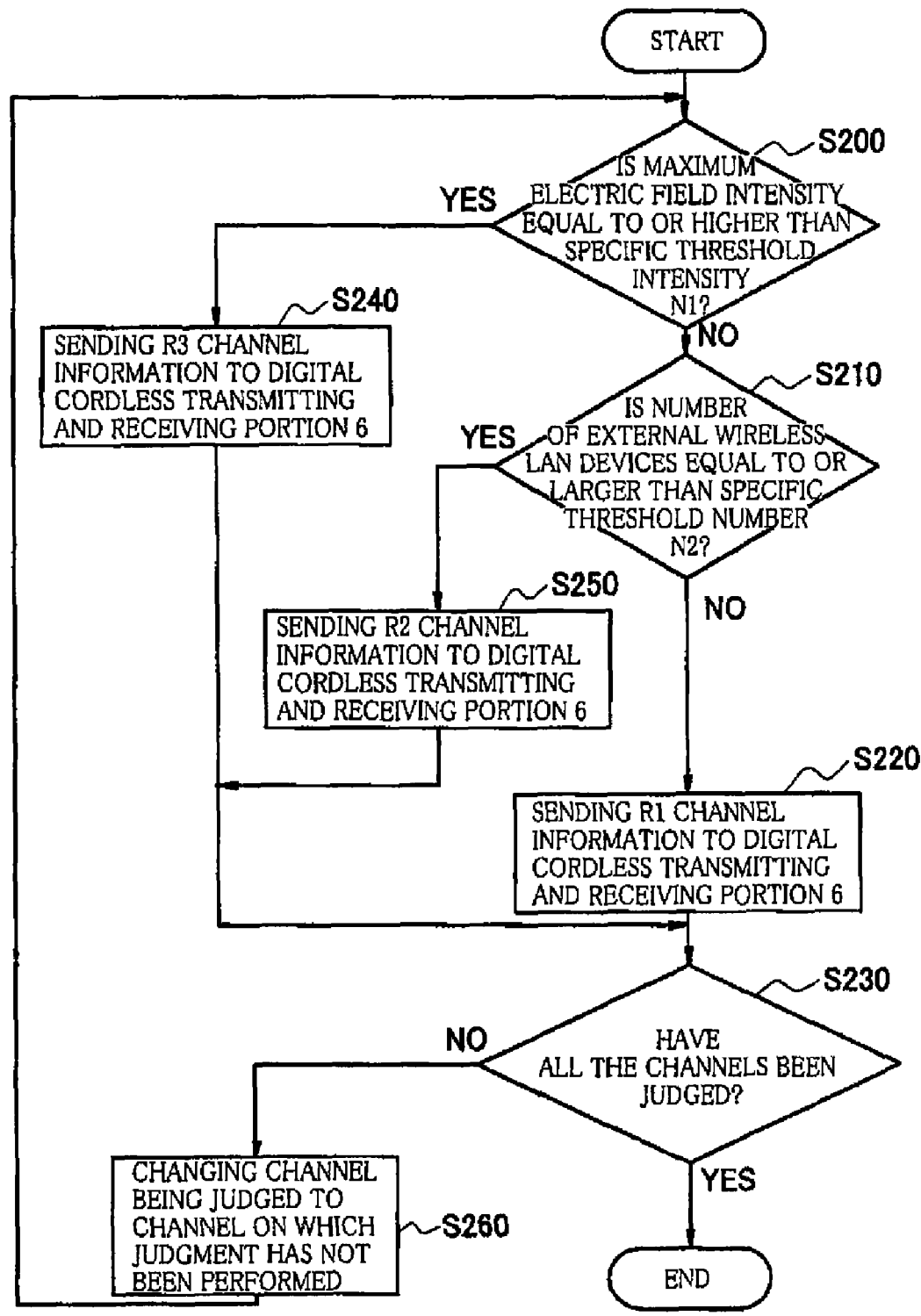
FIG. 6 is a flow chart showing a processing of the wireless LAN transmitting and receiving portion 7.

FIG. 6 is a flow chart showing a processing of the wireless LAN transmitting and receiving portion 7. As described above, the wireless LAN transmitting and receiving portion 7 receives the network identifying information from each of the access points 11. On the basis of the received network identifying information, the wireless LAN transmitting and receiving portion 7 recognizes the maximum electric field intensity in each channel, and sends the R1, R2, R3 channel informations to the digital cordless transmitting and receiving portion 6. Since the received network identifying information is compiled for each of the channels which can be used by the wireless communication apparatus 1 through the wireless communication using the wireless LAN system, the wireless LAN transmitting and receiving portion 7 can recognize the communication condition in each channel which can be used by the wireless communication apparatus 1 and the maximum electric field intensity in the channel without a complex recognition of the frequency bands.

Initially, in S200, the wireless LAN transmitting and receiving portion 7 judges whether the maximum electric field intensity in a channel being judged is equal to or higher than the specific threshold intensity n1. Where the maximum electric field intensity is equal to or higher than the specific threshold intensity n1 (S200: YES), the wireless LAN transmitting and receiving portion 7 sends, in S240, to the digital cordless transmitting and receiving portion 6, the R3 channel information representing that the maximum electric field intensity is equal to or higher than the specific threshold intensity n1 in the channel being judged. Then, in S230, the wireless LAN transmitting and receiving portion 7 judges whether all the channels have been judged.

Where all the channels have been judged (S230: YES), the wireless LAN transmitting and receiving portion 7 completes this processing on the assumption that each of the channel data has been transmitted. Where all the channels have not been judged (S230: NO), the wireless LAN transmitting and receiving portion 7 changes, in S260, the channel being judged to a channel on which the judgment has not been performed. Then, the processing goes back to S200, and the judgment is performed on a new channel.

On the other hand, where the maximum electric field intensity in the channel being judged is lower than the specific threshold intensity n1 (S200: NO), the wireless LAN transmitting and receiving portion 7 judges, in S210, whether the number of the external wireless LAN devices in the channel being judged is equal to or larger than the specific threshold number n2. Where the number of the external wireless LAN devices is equal to or larger than the specific threshold number n2 (S210: YES), the wireless LAN transmitting and receiving portion 7 sends, in S250, to the digital cordless transmitting and receiving portion 6, the R2 channel information representing that the maximum electric field intensity is lower than the specific threshold intensity n1 and the number of the external wireless LAN devices is equal to or larger than the specific threshold number n2 in the channel being judged. Then, the processing goes to S230 in which the wireless LAN transmitting and receiving portion 7 judges whether this processing has been performed on all the channels.

Where the number of the external wireless LAN devices is smaller than the specific threshold number n2 (S210: NO), the wireless LAN transmitting and receiving portion 7 sends, in S220, to the digital cordless transmitting and receiving portion 6, the R1 channel information representing that the maximum electric field intensity is lower than the specific threshold intensity n1 and the number of the external wireless LAN devices is smaller than the specific threshold number n2 in the channel being judged. Then, the processing goes to S230 in which the wireless LAN transmitting and receiving portion 7 judges whether all the channels have been judged.

The wireless LAN transmitting and receiving portion 7 can send all the channel data to the digital cordless transmitting and receiving portion 6 by performing this processing.

Figure 7:
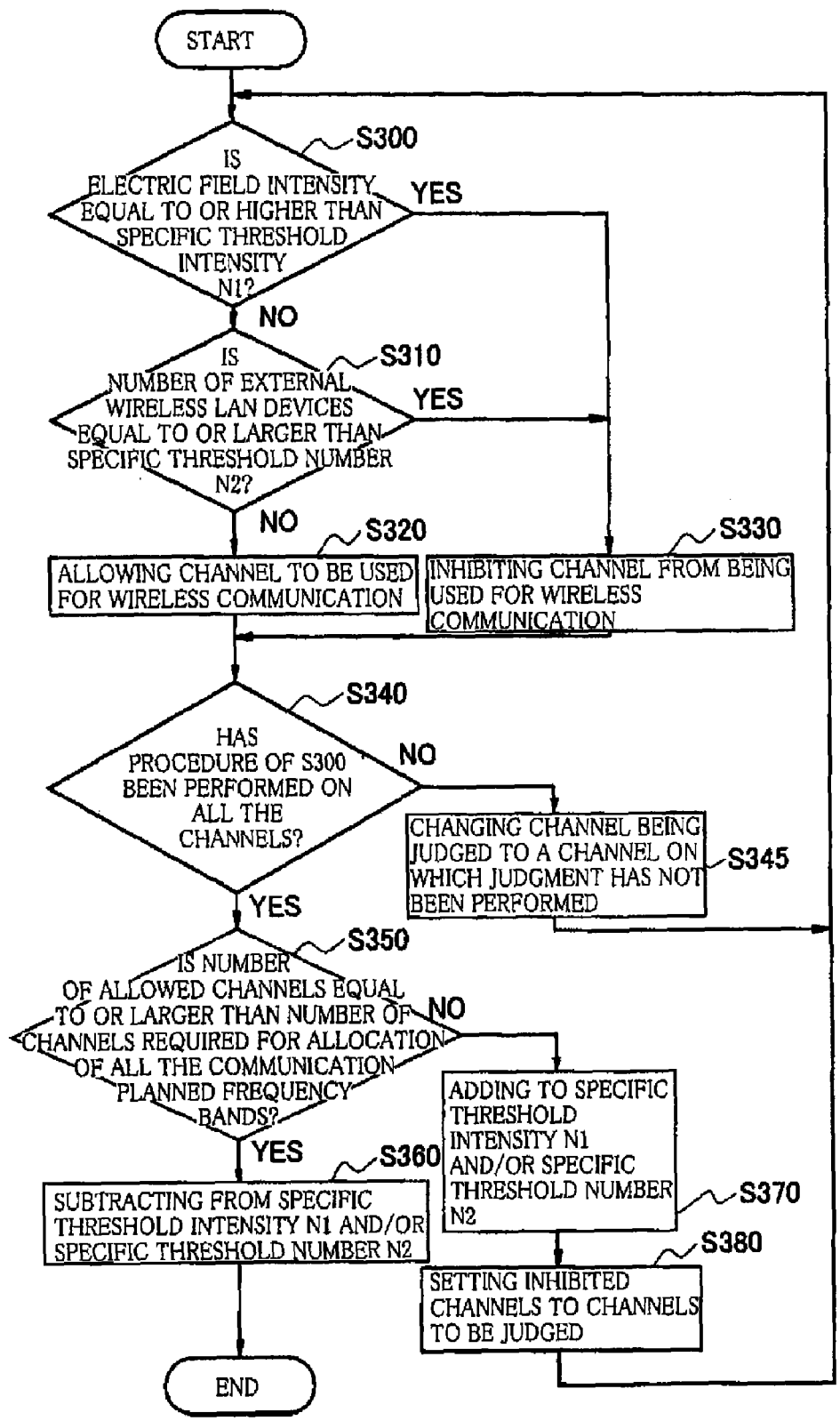
FIG. 7 is a flow chart showing a processing of a digital cordless transmitting and receiving portion 6 of a wireless communication apparatus 1 as a modification of the embodiment.

FIG. 7 is a flow chart showing a processing of a digital cordless transmitting and receiving portion 6 of the wireless communication apparatus 1 as a modification of the embodiment. This wireless communication apparatus 1 differs from the above-described wireless communication apparatus 1 in that at least one of the specific threshold intensity n1 and the specific threshold number n2 is variable. Since the at least one of the specific threshold intensity n1 and the specific threshold number n2 is variable, there can be reduced, for example, a possibility that one or ones of the communication planned frequency bands is or are allocated to a channel in which a plurality of the external wireless LAN devices each having a possibility of generating a maximum electric field intensity slightly lower than the threshold value n1 are present, prior to a channel in which one external wireless LAN device having a possibility of generating a maximum electric field intensity slightly higher than the threshold value n1 is present. Thus, this wireless communication apparatus 1 can determine the communication planned frequency bands in each of which a communication condition is relatively good. It is noted that components of this modification other than the digital cordless transmitting and receiving portion 6 and a wireless LAN transmitting and receiving portion 7 are identical with those of the above-described embodiment, and description thereof is dispensed with.

Initially, in S300, the digital cordless transmitting and receiving portion 6 judges, on the basis of the above-explained channel data received from the wireless LAN transmitting and receiving portion 7, whether the electric field intensity in a channel being judged is equal to or higher than the specific threshold intensity n1. Where the electric field intensity in the channel being judged is lower than the specific threshold intensity n1 (S300: NO), the digital cordless transmitting and receiving portion 6 judges, in S310, whether the above-described number of the external wireless LAN devices in the channel being judged is equal to or larger than the specific threshold number n2.

On the other hand, the electric field intensity in the channel being judged is equal to or higher than the specific threshold intensity n1 (S300: YES), the digital cordless transmitting and receiving portion 6 inhibits, in S330, the channel from being used for the wireless communication between the wireless communication apparatus 1 and the handset 2. That is, the digital cordless transmitting and receiving portion 6 inhibits the allocation of the communication planned frequency bands. More specifically, the digital cordless transmitting and receiving portion 6 inhibits the allocation of the communication planned frequency bands to the high-electric-field-intensity range.

Subsequently, where the number of the external wireless LAN devices in the channel being judged is smaller than the specific threshold number n2 (S310: NO), the digital cordless transmitting and receiving portion 6 allows, in S320, the channel to be used for the wireless communication between the wireless communication apparatus 1 and the handset 2. That is, the digital cordless transmitting and receiving portion 6 allows the allocation of the communication planned frequency bands. More specifically, the digital cordless transmitting and receiving portion 6 allows the allocation of the communication planned frequency bands to the low-electric-field-intensity-small-device-number range.

On the other hand, where the number of the external wireless LAN devices in the channel being judged is equal to or larger than the specific threshold number n2 (S310: YES), the digital cordless transmitting and receiving portion 6 inhibits, in S330, the channel from being used for the wireless communication between the wireless communication apparatus 1 and the handset 2. That is, the digital cordless transmitting and receiving portion 6 inhibits the allocation of the communication planned frequency bands. More specifically, the digital cordless transmitting and receiving portion 6 inhibits the allocation of the communication planned frequency bands to the low-electric-field-intensity-small-device-number range.

Subsequently, in S340, the digital cordless transmitting and receiving portion 6 judges whether the procedure of S300 has been performed on all the channels. Where the procedure of S300 has not been performed on all the channels (S340: NO), the digital cordless transmitting and receiving portion 6 changes, in S345, the channel being judged to a channel on which the judgment has not been performed. Then, the processing goes back to S300, and the judgment is performed on a new channel.

On the other hand, where the procedure of S300 has been performed on all the channels (S340: YES), the digital cordless transmitting and receiving portion 6 judges, in S350, whether the number of the channels allowed in S320 is equal to or larger than a number of the channels required for the allocation of all the communication planned frequency bands. Where the number of the channels allowed in S320 is equal to or larger than the number required for the allocation of all the communication planned frequency bands (S350: YES), the digital cordless transmitting and receiving portion 6 determines the set number of the communication planned frequency bands by allocating to the allowed channels. Then, the digital cordless transmitting and receiving portion 6 subtracts, in S360, a specific value or specific values from at least one of the specific threshold intensity n1 and the specific threshold number n2. That is, where the number of ones of the communication planned frequency bands, which ones are allowed to be determined by the allocation to the low-electric-field-intensity-small-device-number ranges, is equal to or larger than the set number of the communication planned frequency bands, the at least one of the specific threshold intensity n1 and the specific threshold number n2 is decreased by at least one of decreasing the specific threshold intensity n1 by a specific decrease amount and decreasing the specific threshold number n2 by a specific decrease number. Then, this processing is completed. The subtraction from the at least one of the specific threshold intensity n1 and the specific threshold number n2 tightens a criterion of the judgment.

Thus, channels in each of which the electric field intensity is relatively low can be determined when the next processing is performed.

Also, where the number of the channels allowed in S320 is smaller than the number of the channels required for the allocation of all the communication planned frequency bands (S350: NO), the digital cordless transmitting and receiving portion 6 adds, in S370, a specific value or specific values to at least one of the specific threshold intensity n1 and the specific threshold number n2. That is, the at least one of the specific threshold intensity n1 and the specific threshold number n2 is increased by at least one of increasing the specific threshold intensity n1 by a specific increase amount and increasing the specific threshold number n2 by a specific increase number.

Subsequently, in S380, the digital cordless transmitting and receiving portion 6 sets, to channels to be judged, the channels inhibited, in S330, from being used. Then, the processing goes back to S300, and the digital cordless transmitting and receiving portion 6 performs the judgment with new threshold values. That is, the digital cordless transmitting and receiving portion 6 redetermines the communication planned frequency bands by reallocating to the low-electric-field-intensity-small-device-number ranges. The addition to the at least one of the specific threshold intensity n1 and the specific threshold number n2 loosens the criterion of the judgment. Thus, one or ones of the inhibited channels in each of which the communication condition is relatively good can be additionally allowed to be used to secure the set number of the communication planned frequency bands.

In view of this processing including the procedure S300, generally, the digital cordless transmitting and receiving portion 6 determines the communication planned frequency bands by allocating to ones of the frequency ranges in ascending order of the electric field intensity. In other words, the digital cordless transmitting and receiving portion 6 determines the communication planned frequency bands by allocating while excluding ones of the frequency ranges in descending order of the electric field intensity. As a result, even where a number of the inhibited channels is larger than the number of the channels required for the allocation of the communication planned frequency bands, the radio interference can be effectively prevented.

Further, in view of this processing including the procedure S310, generally, the digital cordless transmitting and receiving portion 6 determines the communication planned frequency bands by allocating to ones of the frequency ranges in ascending order of the number of the external wireless LAN devices. In other words, the digital cordless transmitting and receiving portion 6 determines the communication planned frequency bands by allocating while excluding ones of the frequency ranges in descending order of the number of the external wireless LAN devices. As a result, even where a number of the inhibited channels is larger than the number of the channels required for the allocation of the communication planned frequency bands, the radio interference can be effectively prevented by decreasing the number of the external wireless LAN devices each having the possibility of the occurrence of the radio interference. Also, it is desirable that, in S360 or S370, the digital cordless transmitting and receiving portion 6 subtracts or adds specific values to or from both of the specific threshold intensity n1 and the specific threshold number n2 to properly adjust the specific threshold intensity n1 and the specific threshold number n2.

In this processing, the set number of the communication planned frequency bands are determined by the digital cordless transmitting and receiving portion 6 of the wireless communication apparatus 1 as the modification of the above-described embodiment.

Figure 8:
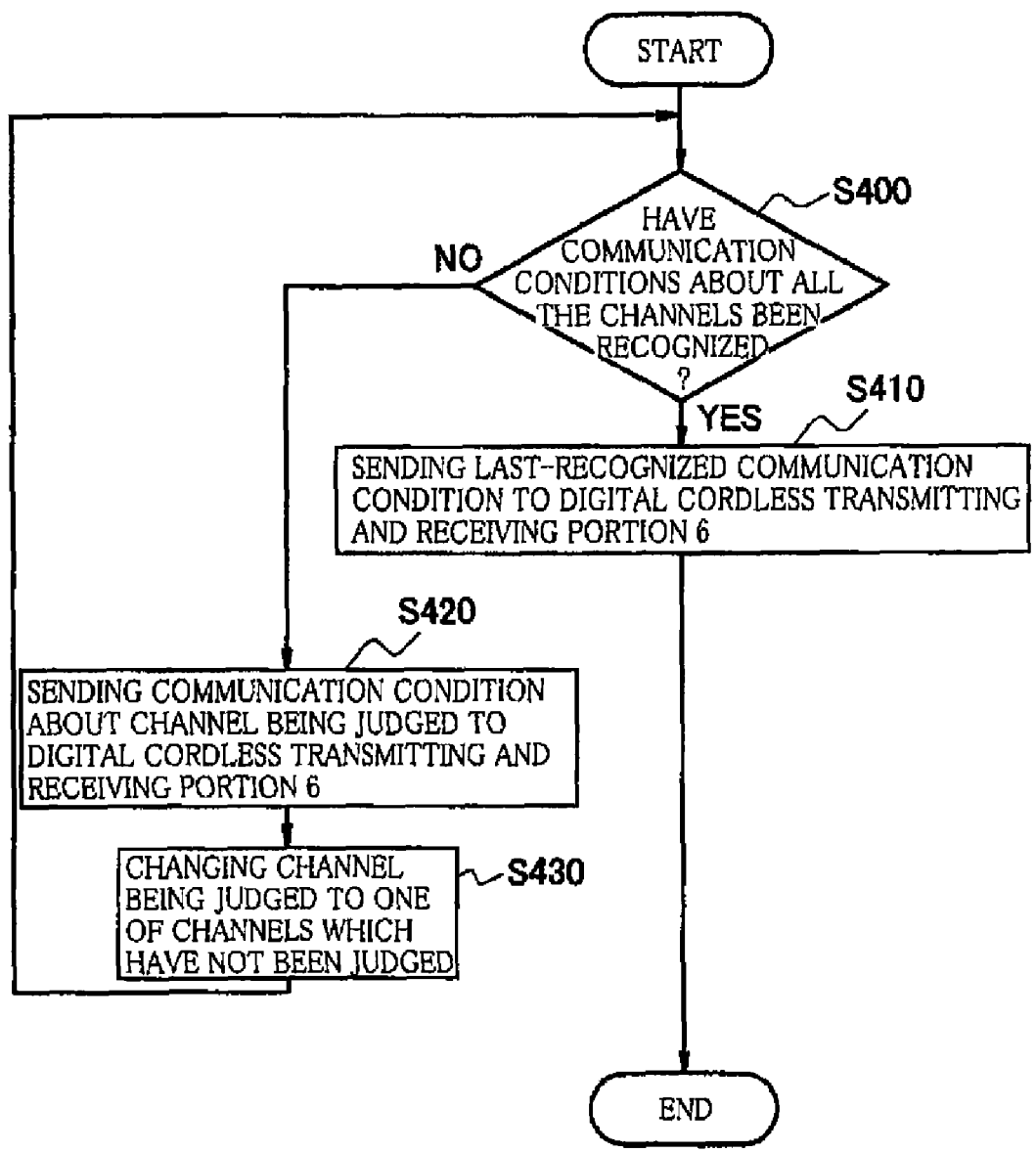
FIG. 8 is a flow chart showing a processing of a wireless LAN transmitting and receiving portion 7 of the wireless communication apparatus 1 as the modification of the embodiment.

FIG. 8 is a flow chart showing a processing of the wireless LAN transmitting and receiving portion 7 of the wireless communication apparatus 1 as the modification of the above-described embodiment. Initially, in S400, the wireless LAN transmitting and receiving portion 7 judges whether the communication conditions about all the channels have been recognized. Where the communication conditions about all the channels have been recognized (S400: YES), the wireless LAN transmitting and receiving portion 7 sends, in S410, one of the communication conditions which is last recognized, to the digital cordless transmitting and receiving portion 6.

On the other hand, where the communication conditions about all the channels have not been recognized (S400: NO), the wireless LAN transmitting and receiving portion 7 sends, in S420, a communication condition about the channel being judged, to the digital cordless transmitting and receiving portion 6. Then, in S430, the wireless LAN transmitting and receiving portion 7 changes the channel being judged to one of remaining channels which have not been judged, and the processing goes back to S400.

In this processing, the communication conditions about all the channel are sent to the digital cordless transmitting and receiving portion 6 by the wireless LAN transmitting and receiving portion 7 of the wireless communication apparatus 1 as the modification of the above-described embodiment.

What is claimed is:
1. A wireless communication apparatus comprising:
a specific external communication section configured to communicate with a specific external communication device through a wireless communication while successively changing a communication frequency band that is a frequency band in which a communication is performed; and
a communication condition recognizing section configured to recognize a communication condition in each of a plurality of frequency ranges each having a predetermined range width,
wherein the specific external communication section determines, on the basis of the recognized communication condition in each of the plurality of frequency ranges, a set number of a plurality of communication planned frequency bands in each of which the specific external communication section is planned to communicate with the specific external communication device, by allocating to a part of the plurality of frequency ranges,
wherein the specific external communication section communicates, in the determined communication planned frequency bands, with the specific external communication device while successively changing the communication frequency band,
wherein the communication condition recognizing section recognizes, as the communication condition in each of the plurality of frequency ranges, an electric field intensity in each of the plurality of frequency ranges and a number of the communication devices communicating in each of the plurality of frequency ranges, and
wherein the specific external communication section determines the set number of the plurality of communication planned frequency bands on the basis of the electric field intensity and the number of the communication devices communicating in each of the plurality of frequency ranges such that the electric field intensity takes priority over the number of the communication devices in the determination of the specific external communication section.

2. The wireless communication apparatus according to claim 1,
wherein each of the plurality of frequency ranges has the range width in which a plurality of communication frequency bands each as the communication frequency band are allowed to be set.

3. The wireless communication apparatus according to claim 1,
wherein the specific external communication section determines the plurality of communication planned frequency bands such that an interference with the wireless communication between the specific external communication section and the specific external communication device is minimized.

4. The wireless communication apparatus according to claim 1, further comprising, independently of the specific external communication section, another external communication section which is communicable with at least one external communication device different from the specific external communication device.

5. The wireless communication apparatus according to claim 4,
wherein the another external communication section is communicable with any of the at least one external communication device different from the specific external communication device in each of a plurality of communicable frequency bands respectively corresponding to the plurality of frequency ranges.

6. The wireless communication apparatus according to claim 4,
wherein the another external communication section is configured to communicate, through the wireless communication using a wireless LAN system, with the at least one external communication device different from the specific external communication device.

7. The wireless communication apparatus according to claim 6,
wherein the communication condition recognizing section recognizes the communication condition in each of the plurality of frequency ranges, on the basis of network identifying information received by the another external communication section.

8. The wireless communication apparatus according to claim 1,
wherein the specific external communication section is configured to perform a cordless phone communication, and
wherein the wireless communication apparatus functions as a main unit configured to communicate with the specific external communication device as a handset and establishes a cordless phone system with the specific external communication device.

9. The wireless communication apparatus according to claim 1,
wherein the specific external communication section determines the plurality of communication planned frequency bands by allocating to ones of the plurality of frequency ranges in ascending order of the electric field intensity.

10. The wireless communication apparatus according to claim 1,
wherein the specific external communication section determines the plurality of communication planned frequency bands by allocating while excluding ones of the plurality of frequency ranges in descending order of the electric field intensity.

11. The wireless communication apparatus according to claim 1,
wherein the specific external communication section determines the plurality of communication planned frequency bands by allocating, on a priority basis, to at least one low-electric-field-intensity range of the plurality of frequency ranges, the electric field intensity being lower than a specific threshold intensity in each of the at least one low-electric-field-intensity range.

12. The wireless communication apparatus according to claim 11,
wherein the communication condition recognizing section further recognizes, as the communication condition in each of the plurality of frequency ranges, the number of the communication devices communicating in each of the plurality of frequency ranges, and
wherein, in the allocation to the at least one low-electric-field-intensity range, the specific external communication section allocates, on the priority basis, to at least one low-electric-field-intensity-small-device-number range each as one of the at least one low-electric-field-intensity range, the number of the communicating communication devices being smaller than a specific threshold number in the one of the at least one low-electric-field-intensity range.

13. The wireless communication apparatus according to claim 12,
wherein, in the allocation to the at least one low-electric-field-intensity small-device-number range, the specific external communication section allocates to the at least one low-electric-field-intensity small-device-number range in ascending order of the electric field intensity regardless of the number of the communicating communication devices.

14. A wireless communication apparatus comprising:
a specific external communication section configured to communicate with a specific external communication device through a wireless communication while successively changing a communication frequency band that is a frequency band in which a communication is performed; and
a communication condition recognizing section configured to recognize a communication condition in each of a plurality of frequency ranges each having a predetermined range width,
wherein the specific external communication section determines, on the basis of the recognized communication condition in each of the plurality of frequency ranges, a set number of a plurality of communication planned frequency bands in each of which the specific external communication section is planned to communicate with the specific external communication device, by allocating to a part of the plurality of frequency ranges,
wherein the specific external communication section communicates, in the determined communication planned frequency bands, with the specific external communication device while successively changing the communication frequency band,
wherein the communication condition recognizing section recognizes, as the communication condition in each of the plurality of frequency ranges, at least one of an electric field intensity in each of the plurality of frequency ranges and a number of communication devices communicating in each of the plurality of frequency ranges, wherein the communication condition recognizing section recognizes, as the communication condition in each of the plurality of frequency ranges, at least the electric field intensity in each of the plurality of frequency ranges, wherein the specific external communication section determines the plurality of communication planned frequency bands by allocating, on a priority basis, to at least one low-electric-field-intensity range of the plurality of frequency ranges, the electric field intensity being lower than a specific threshold intensity in each of the at least one low-electric-field-intensity range, wherein the communication condition recognizing section further recognizes, as the communication condition in each of the plurality of frequency ranges, the number of the communication devices communicating in each of the plurality of frequency ranges, wherein, in the allocation to the at least one low-electric-field-intensity range, the specific external communication section allocates, on the priority basis, to at least one low-electric-field-intensity-small-device-number range each as one of the at least one low-electric-field-intensity range, the number of the communicating communication devices being smaller than a specific threshold number in the one of the at least one low-electric-field-intensity range, and wherein where a number of ones of the plurality of communication planned frequency bands, which ones are determined by the allocation to the at least one low-electric-field-intensity small-device-number range, is smaller than the set number, the specific external communication section determines remaining at least one of the plurality of communication planned frequency bands by allocating to at least one low-electric-field-intensity-large-device-number range each as one of the at least one low-electric-field-intensity range, the number of the communicating communication devices being equal to or larger than the specific threshold number in the one of the at least one low-electric-field-intensity range.

15. The wireless communication apparatus according to claim 14, wherein, in the allocation to the at least one low-electric-field-intensity-large-device-number range, the specific external communication section allocates to the at least one low-electric-field-intensity-large-device-number range in ascending order of the number of the communicating communication devices.

16. The wireless communication apparatus according to claim 11, wherein where a number of ones of the plurality of communication planned frequency bands, which ones are determined by the allocation to the at least one low-electric-field-intensity range, is smaller than the set number, the specific external communication section determines remaining at least one of the plurality of communication planned frequency bands by allocating to at least one high-electric-field-intensity range each as one of the plurality of frequency ranges, the electric field intensity being equal to or higher than the specific threshold intensity in the one of the plurality of frequency ranges.

17. A wireless communication apparatus comprising:

a specific external communication section configured to communicate with a specific external communication device through a wireless communication while successively changing a communication frequency band that is a frequency band in which a communication is performed; and a communication condition recognizing section configured to recognize a communication condition in each of a plurality of frequency ranges each having a predetermined range width, wherein the specific external communication section determines, on the basis of the recognized communication condition in each of the plurality of frequency ranges, a set number of a plurality of communication planned frequency bands in each of which the specific external communication section is planned to communicate with the specific external communication device, by allocating to a part of the plurality of frequency ranges, wherein the specific external communication section communicates, in the determined communication planned frequency bands, with the specific external communication device while successively changing the communication frequency band, wherein the communication condition recognizing section recognizes, as the communication condition in each of the plurality of frequency ranges, at least one of an electric field intensity in each of the plurality of frequency ranges and a number of communication devices communicating in each of the plurality of frequency ranges, wherein the communication condition recognizing section recognizes, as the communication condition in each of the plurality of frequency ranges, at least the electric field intensity in each of the plurality of frequency ranges, wherein the specific external communication section determines the plurality of communication planned frequency bands by allocating, on a priority basis, to at least one low-electric-field-intensity range of the plurality of frequency ranges, the electric field intensity being lower than a specific threshold intensity in each of the at least one low-electric-field-intensity range, wherein where a number of ones of the plurality of communication planned frequency bands, which ones are determined by the allocation to the at least one low-electric-field-intensity range, is smaller than the set number, the specific external communication section determines remaining at least one of the plurality of communication planned frequency bands by allocating to at least one high-electric-field-intensity range each as one of the plurality of frequency ranges, the electric field intensity being equal to or higher than the specific threshold intensity in the one of the plurality of frequency ranges, wherein the communication condition recognizing section further recognizes, as the communication condition in each of the plurality of frequency ranges, the number of the communication devices communicating in each of the plurality of frequency ranges, and wherein, in the allocation to the at least one high-electric-field-intensity range, the specific external communication section allocates to the at least one high-electric-field-intensity range in ascending order of the number of the communicating communication devices.

18. The wireless communication apparatus according to claim 1,
wherein the specific external communication section determines the plurality of communication planned frequency bands by allocating to ones of the plurality of frequency ranges in ascending order of the number of the communicating communication devices.

19. The wireless communication apparatus according to claim 1,
wherein the specific external communication section determines the plurality of communication planned frequency bands by allocating while excluding ones of the plurality of frequency ranges in descending order of the number of the communicating communication devices.

20. The wireless communication apparatus according to claim 1,
wherein the specific external communication section determines the plurality of communication planned frequency bands by allocating to at least one low-electric-field-intensity-small-device-number range each as one of the plurality of frequency ranges, the electric field intensity being lower than a specific threshold intensity and the number of the communicating communication devices being smaller than a specific threshold number in the one of the plurality of frequency ranges.

21. A wireless communication apparatus comprising:
a specific external communication section configured to communicate with a specific external communication device through a wireless communication while successively changing a communication frequency band that is a frequency band in which a communication is performed; and
a communication condition recognizing section configured to recognize a communication condition in each of a plurality of frequency ranges each having a predetermined range width,
wherein the specific external communication section determines, on the basis of the recognized communication condition in each of the plurality of frequency ranges, a set number of a plurality of communication planned frequency bands in each of which the specific external communication section is planned to communicate with the specific external communication device, by allocating to a part of the plurality of frequency ranges,
wherein the specific external communication section communicates, in the determined communication planned frequency bands, with the specific external communication device while successively changing the communication frequency band,
wherein the communication condition recognizing section recognizes, as the communication condition in each of the plurality of frequency ranges, at least one of an electric field intensity in each of the plurality of frequency ranges and a number of communication devices communicating in each of the plurality of frequency ranges,
wherein the communication condition recognizing section recognizes, as the communication condition in each of the plurality of frequency ranges, the electric field intensity in each of the plurality of frequency ranges and the number of the communication devices communicating in each of the plurality of frequency ranges,
wherein the specific external communication section determines the plurality of communication planned frequency bands by allocating to at least one low-electric-field-intensity-small-device-number range each as one of the plurality of frequency ranges, the electric field intensity being lower than a specific threshold intensity and the number of the communicating communication devices being smaller than a specific threshold number in the one of the plurality of frequency ranges, and
wherein where a number of ones of the plurality of communication planned frequency bands, which ones are determined by the allocation to the at least one low-electric-field-intensity small-device-number range, is smaller than the set number, the specific external communication section performs a processing in which at least one of the specific threshold intensity and the specific threshold number is increased, and redetermines the plurality of communication planned frequency bands by reallocating to the at least one low-electric-field-intensity-small-device-number range.

22. The wireless communication apparatus according to claim 21,
wherein the specific external communication section performs the processing in which the at least one of the specific threshold intensity and the specific threshold number is increased, by at least one of increasing the specific threshold intensity by a specific increase amount and increasing the specific threshold number by a specific increase number.

23. The wireless communication apparatus according to claim 21,
wherein where a number of ones of the plurality of communication planned frequency bands, which ones are allowed to be determined by the allocation to the at least one low-electric-field-intensity small-device-number range, is equal to or larger than the set number, the specific external communication section performs a processing in which the at least one of the specific threshold intensity and the specific threshold number is decreased.

24. The wireless communication apparatus according to claim 23,
wherein the specific external communication section performs the processing in which the at least one of the specific threshold intensity and the specific threshold number is decreased, by at least one of decreasing the specific threshold intensity by a specific decrease amount and decreasing the specific threshold number by a specific decrease number.

* * * * *